F. G. BREUL.
METHOD OF MAKING CHAIN LINKS.
APPLICATION FILED MAY 17, 1913.
1,084,250.
Patented Jan. 13, 1914.
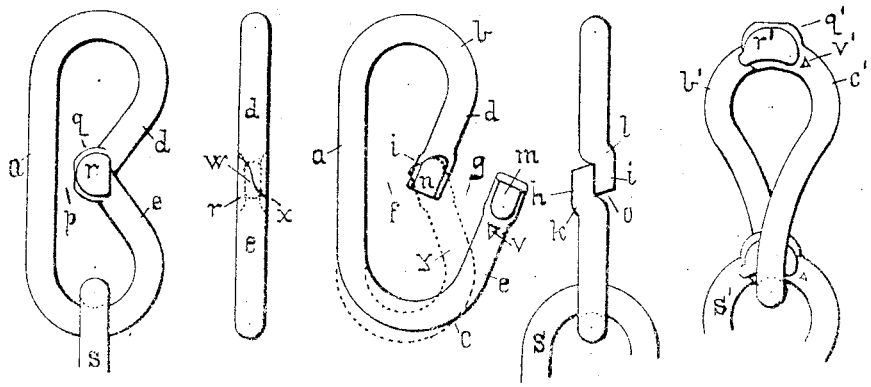
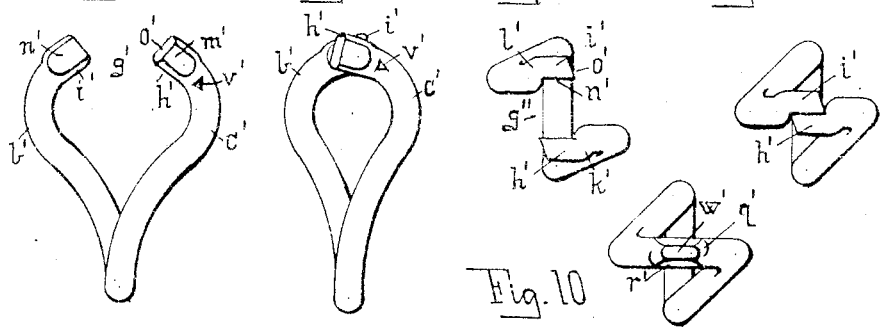
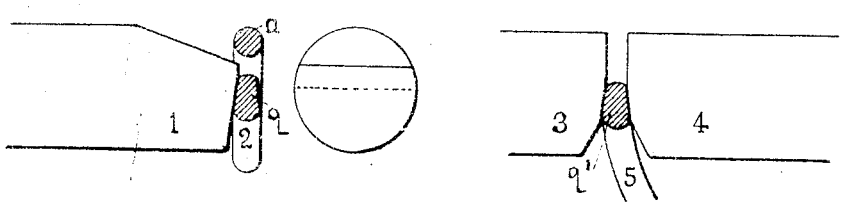
WITNESSES:
F. Nemes
Stephen Masek
Frederick G. Breul INVENTOR

UNITED STATES PATENT OFFICE.

FREDERICK G. BREUL, OF BRIDGEPORT, CONNECTICUT.

METHOD OF MAKING CHAIN-LINKS.

1,084,250.
Specification of Letters Patent.
Patented Jan. 13, 1914.

Application filed May 17, 1913. Serial No. 768,290.

*To all whom it may concern:*

Be it known that I, FREDERICK G. BREUL, a citizen of the United States, residing at Bridgeport, in the county of Fairfield and State of Connecticut, have invented a new and useful Method of Making Chain-Links, as disclosed and described in the annexed drawings and specification.

My invention relates to the manufacture of electrically welded chain links and has for its object the proper shaping and forming of such links for the purpose of uniting the overlapping wire ends thereof by welding them electrically.

At the present time the electric welding of chain links is accomplished by butt welding, the wire ends being brought into line and forced together lengthwise while the electric current acts on and heats them.

The welding by electricity of chain links with overlapping ends has not been successful so far on account of the absolute rigidity of the chain links, the welding process affecting, heating and reducing only the overlapping wire ends, but being unable to change the direction of the stiff wire portions bent away from the proper plane of the link so as to overlap the ends. This circumstance results in a misformed link, the welded portion lying in a different line than the two adjoining link portions originally bent to pass each other in a parallel direction and still retaining that direction. As a rule, moreover, only a partial or defective weld can be obtained, because the operative faces of the electrodes, if of large size, will either burn the metal in the wire portions adjoining the overlapping ends, or will be prevented by the said adjoining link portions to follow up and compress the molten metal in the ends and this will result in a blowout, or hole in place of the weld. Another difficulty presents itself in the disposition of the surplus molten metal forced off during the welding process and forming irregular protuberances or fashes on both sides of the wire. By the new method herein described I have overcome all these defects and obtain thoroughly serviceable links for rapidly and cheaply connecting or constructing lengths of chain, the welding process being reliable and so simple as to be correctly and almost instantly performed by an inexperienced person.

Figure 1, of the drawings represents a finished straight link according to my method, and Fig. 2 a side view thereof. In Fig. 3 is shown a plan view and in Fig. 4 a side view of such a link as shaped by forming tools and ready for attachment and the closing and final welding process. A completed twisted link is seen in Fig. 5 and an end view thereof in Fig. 10. An open twisted link ready for connection is shown in Fig. 6, and when closed such a link appears as in Fig. 7. Another mode of forming such a twisted link is shown by an end view in Fig. 8, and Fig. 9 represents an end view of such a link when closed and ready for welding. Parts of adjoining links are attached to links shown in Figs. 1, 4 and 5. Welding electrodes and their application are illustrated in Figs. 11, 12 and 13.

Referring to Fig. 3, a straight link is formed to consist of a side shank $a$, two end bows $b$ and $c$, and two shank portions $d$ and $e$ designed for final connection by welding. Shank $d$ is bent inwardly in an angle toward shank $a$, reducing the width of the central part of the link eye to width or space marked $f$, or just sufficient for the passage therethrough of another link or attachment. Shank $e$ is then bent into a position parallel to shank $d$, which means in an angle outwardly from shank $a$, and a space $g$, of practically the same width as space $f$, is left between shanks $d$ and $e$. The wire end portions are then offset at $h$ and $i$, see Fig. 4, and slightly flattened so that the inner faces of the offset portions $h$ and $i$ will lie in the center line of the link wire. The wire ends are preferably slightly chamfered, as at $o$. The link may now be connected to an attachment along shank $e$, bow $c$ and shank $a$, through spaces $g$ and $f$, to finally remain in the part of the eye inclosed by bow $b$, and another link may be introduced to remain on bow $c$. Shank $e$ is then bent inwardly until the two offset portions meet and rest upon each other, as illustrated by dotted lines $y$, Fig. 3. Together the two shanks $d$ and $e$ are then brought still more inward, to further reduce the width of space $f$, and thereby a partition of the link eye is formed, confining the attached links to opposite link ends and preventing possible entanglement. Before proceeding with the description of this flat link I will now explain the construction of the twisted link shown in the drawings.

The open link, Fig. 6, has the end bows $b'$ and $c'$ with the offsets $h'$ and $i'$, which, when brought together endwise, in the plane of the bows, will form a closed link according to Fig. 7, and the lateral position of the offsets and shanks in such a closed link is illustrated in Fig. 9, an end view thereof. Such twisted links may also be first formed as represented in Fig. 8, an opening, $g''$ being left between the inner faces of the offset portions $l'$ and $h'$. A previously formed link or an attachment having been introduced, these offset portions are forced together laterally by pressure on their outsides, and a closed link will be formed like Fig. 7, the end view thereof being like Fig. 9, having the end bows $b'$ and $c'$ in line and the inner faces of the offsets lining with the center line of the bows. The wire ends may be chamfered, see $O'$, Fig. 8, or shaped otherwise. The small impression $v'$, near the flat place $m'$ on bow $c'$ is merely a mark made by the offsetting die, is present as well on the outside of bow $b'$ and of no significance. It will be observed that the offset wire end portions do not continuously overlap each other, but cross outwardly in the case of the twisted link and inwardly to complete the formation of the straight link, as already referred to. Although only small portions of the wire ends extend past the crossing contact, it is obvious that the greater part of the joints formed by the wire offsets is disposed outwardly for the twisted link, and inwardly in the straight link.

The welding operation is performed by a spot electric welding machine, the electrodes being the usual plain copper rods, in which however the front halves of the operative faces are reduced so that a wedge shaped space, enlarging outwardly from the middle line, will be between them, as they approach each other. Two electrodes, exactly alike, are used for welding the straight link and a side view of their operative ends is shown by I, in Fig. 11, and a face view of them in Fig. 12. The rear parts of these electrodes are cut away as shown, to allow space for the side bar "$a$" of the link, which bar should not be acted on by the current. A central sectional view of the welded link denoted by "2" is shown in Fig. 11 in the position the welding operation is done, $q$ represents the welded portion thereof.

In Fig. 13 the operative ends, see 3 and 4, of the two electrodes used for welding the twisted links are shown, a central sectional view of a welded joint $q'$ including a portion of such a link, 5, being situated between them, in the position it was welded. The fronts of these electrode faces are chamfered off some, to allow for the sweep of the twisted shanks.

For the purpose of welding these links, they are, either kind shown, placed on the lower electrode so that the extreme wire ends beyond the wire crossing will come near an imaginary middle line of such electrode. As the upper electrode advances, these wire ends and adjoining portions of the offsets will receive the first and hardest pressure of the electrodes, they are thereby heated first and afterward to the highest and melting degree. Just as the melting and welding proceeds, and the double layer of wire in the outer portions of the offsets is being reduced to and partly beyond the size of the wire diameter, the pressure of the continuously advancing upper electrode forces the melted metal further outward and forms welding joints of substantially the shape illustrated in Figs. 1 and 5. The dotted lines in Fig. 2 represent the visible outlines of the welding joint "$q$" on the inside of Fig. 1, and similar full lines in Fig. 10 are the outlines of the welding joint of the twisted link. Fig. 5. Well defined flat spots, $w$, Fig. 2, and also $w'$, Fig. 10, are seen on the ends of these welding joints, and these occur there, because the electrodes, according to Figs. 11 and 13 only press the sides of the welds, producing opposite and inclined flattened faces, as shown by $r$, Fig. 1, and by $r'$, Fig. 10. The line X, Fig. 2, represents the partly noticeable line of union of the wire ends. As the metal on the reverse or inner side of the crossing end portions is only acted on by the electrodes at the close of the operation, it never melts, is only made just hot enough to be pressed into the desired shape, and practically no fluid metal can emerge from and be deposited in this direction. Thereafter the links are tumbled in sand or gravel and then in sawdust, rounding off and smoothening the welds. If desired, these welded joints may receive more rounded or oval shapes, by having a portion, of somewhat less than half the depth of such special shapes sunk into the electrode faces, and guide plates or guide pins held by a nonconducting plate secured to the lower electrode may then be employed for giving the proper position to the links.

It is apparent from the foregoing, that by this novel method only the heating, welding and compressing of a short double layer of metal is required and readily accomplished by the electrodes and welding current and nothing can obstruct the advancement of the electrodes until they have completed their work and have reduced the double layer of wire in the offsets to a perfect welded joint of the same thickness of and in line with the united link end portions. It is obvious that flat, oval or square links, or rings may be formed and united on this principle, the wire ends being offset, and made to cross each other, pointing either way, to the outside or inside and welded as described, just as may be preferable for their general or special use.

Having thus described my improved method, its application and advantages, I claim,—

1. The method of making a chain link, consisting in offsetting and crossing the ends of the wire forming the link, and subjecting the crossed ends to a lateral electric welding process, by which the extreme wire ends receive the most and highest welding heat, the melted metal being compressed into a weld extending in the direction of the plane of the crossing ends.

2. The herein described method of joining the ends of a wire link, and consisting in offsetting the wire end portions one half the wire diameter laterally outward and crossing them at a point and in a direction desirable for the location of a welding point, and then uniting the ends by electric welding, performed by electrodes, primarily and prominently engaging, heating, melting and compressing the extreme wire ends laterally, and thereby reducing the double layer of metal in the crossing wires to the thickness of approximately one wire diameter, the surplus metal forming a protuberance on the link in the direction of the plane of the crossing wires.

3. The method of making welded chain links, consisting in shaping a link of wire, crossing the ends, offsetting all thereof within crossing contact laterally outward, the inner faces of these offsets lining with the center line of the adjoining link portions, and in finally welding together the double layer of wire in the crossing by electric current and lateral pressure through electrodes applied to prominently heat, melt, compress and weld the extreme wire ends; bringing the welded joint in line with both adjoining link portions and the superfluous melted metal into the direction of the plane of the crossing wire ends.

FREDERICK G. BREUL.

Witnesses:
F. NIEMES,
STEPHEN MASEK.